(No Model.)  
4 Sheets—Sheet 1.
F. W. EDWARDS.
CAN SOLDERING MACHINE.
No. 301,578. Patented July 8, 1884.
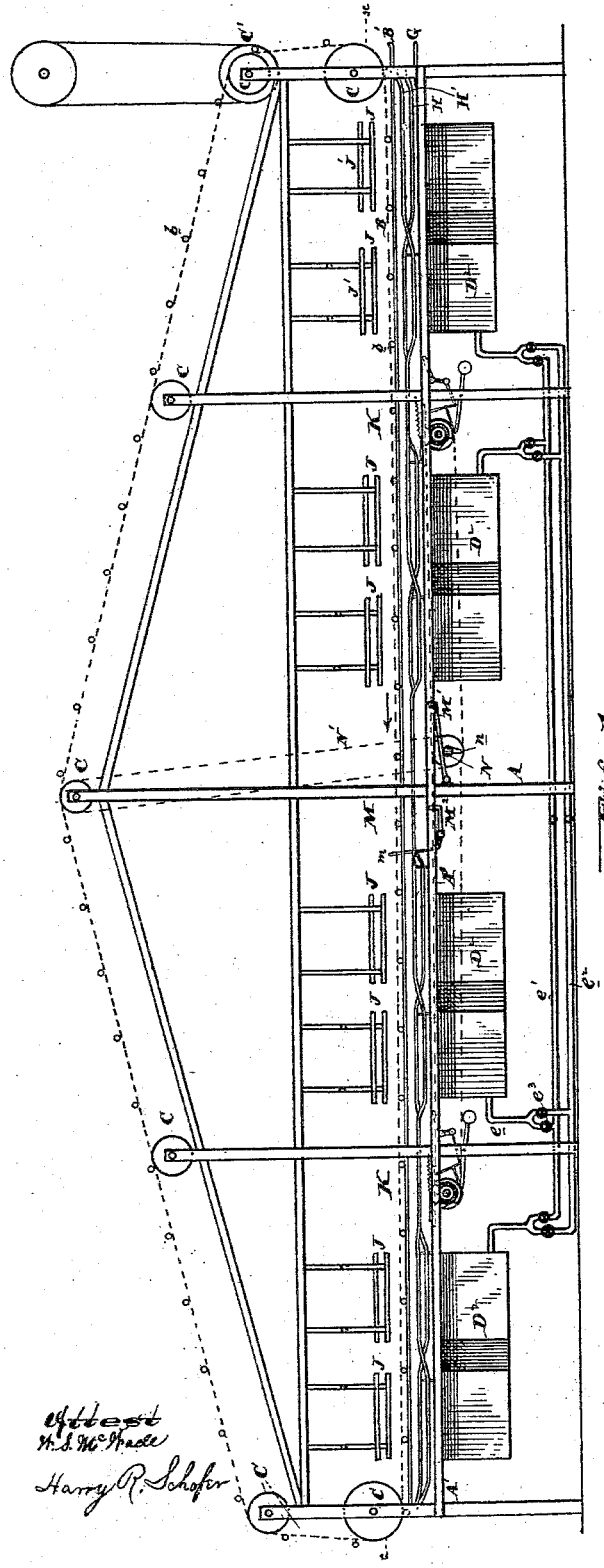
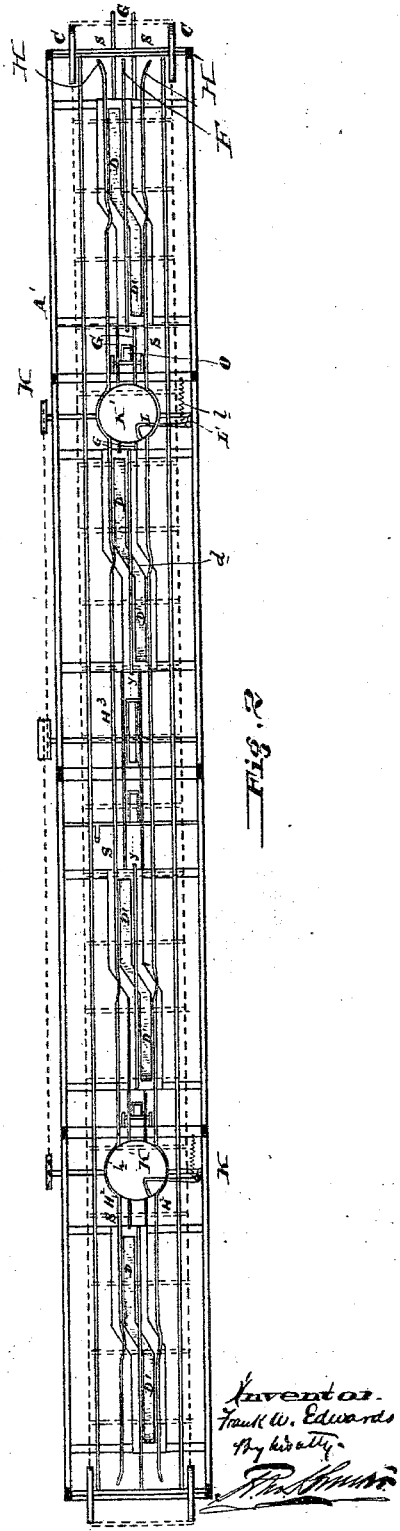

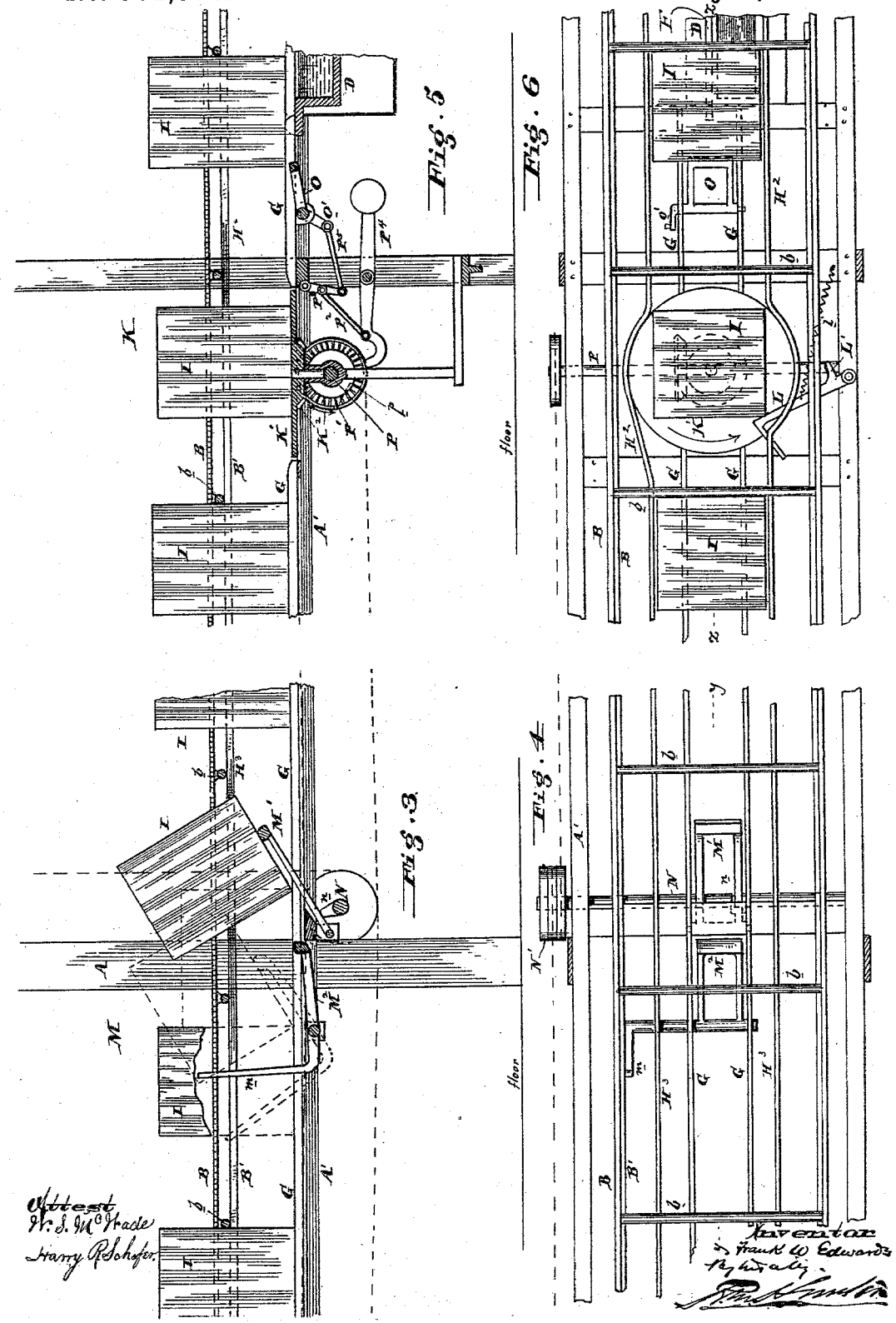

(No Model.) 4 Sheets—Sheet 3.
F. W. EDWARDS.
CAN SOLDERING MACHINE.
No. 301,578. Patented July 8, 1884.

Attest
Wes. McWade
Harry R. Schafer

Inventor
Frank W Edwards
By his atty

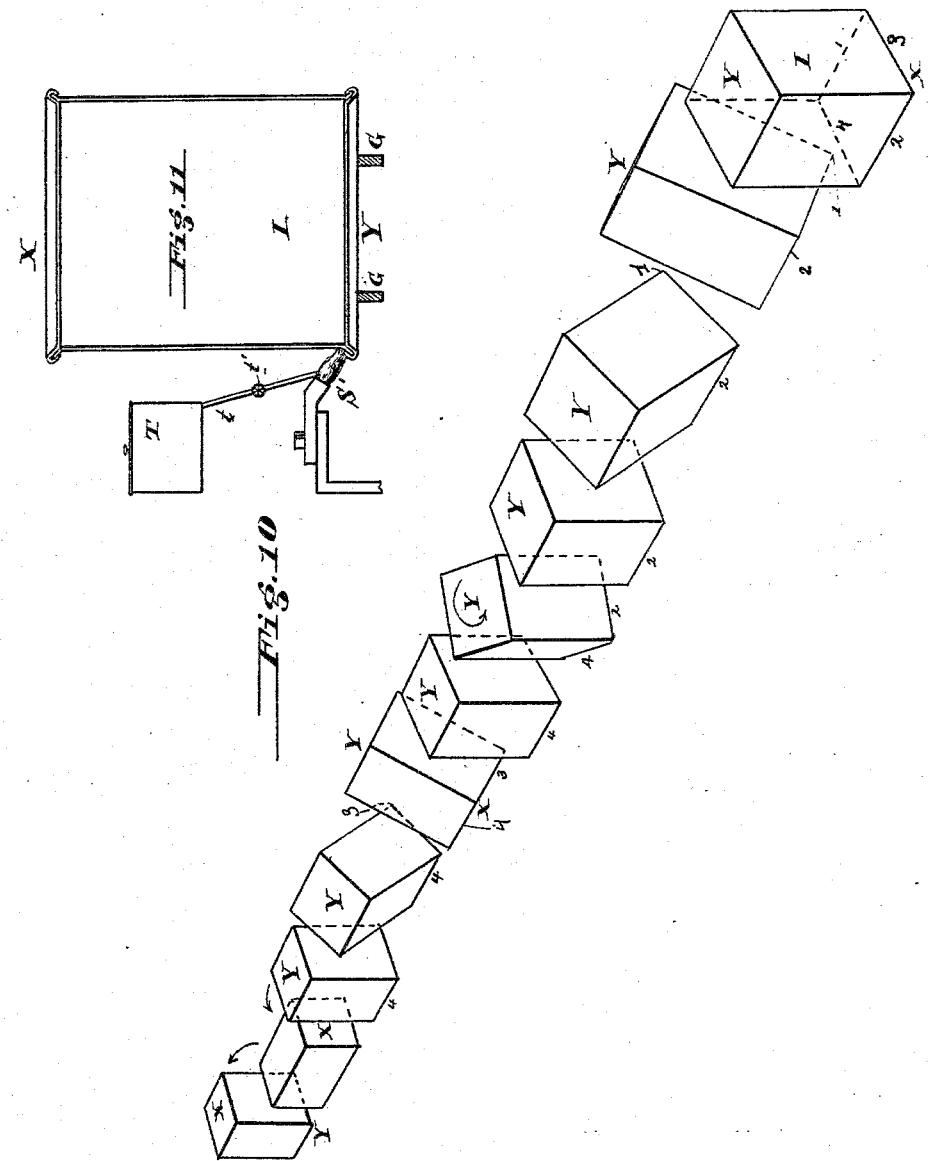

UNITED STATES PATENT OFFICE.

FRANK W. EDWARDS, OF THURLOW, PENNSYLVANIA.

CAN-SOLDERING MACHINE.

SPECIFICATION forming part of Letters Patent No. 301,578, dated July 8, 1884.

Application filed February 21, 1884. (No model.)

*To all whom it may concern:*

Be it known that I, FRANK W. EDWARDS, of Thurlow, county of Delaware, and State of Pennsylvania, have invented an Improvement in Tin-Can-Soldering Machines, of which the following is a specification.

My invention has reference to can-soldering machines; and it consists in certain improvements in mechanism and combinations of mechanism whereby a cubical tin can having its heads clamped on the body may automatically be handled by the machine in such a manner that the eight seams are soldered in succession, which mechanism and combinations of mechanisms are fully set forth in the following specification, and shown in the accompanying drawings, which form part thereof. In a machine of this class the can is manipulated so as to present its various seams in succession as it passes over receptacles containing molten solder, into which the said seams are dipped. The acid may be applied to all of the seams before the can is placed in the machine, or may be applied during its travel and just prior to passing over a solder-receptacle. In passing through the machine the can is first tilted to one side to present one seam, then to the other side to present the seam diametrically opposite; then it is turned a quarter of a revolution on its vertical axis, and the same operations are repeated once more. The can is then soldered on one end, and is next thrown down and its rear end lifted, thus placing on the bottom the end which was originally on the top, and the first five operations are gone through with once more to solder this end, thus completing all of the seams, as the body-seams were previously soldered in another machine, forming subject-matter of another pending application.

Figure 8:
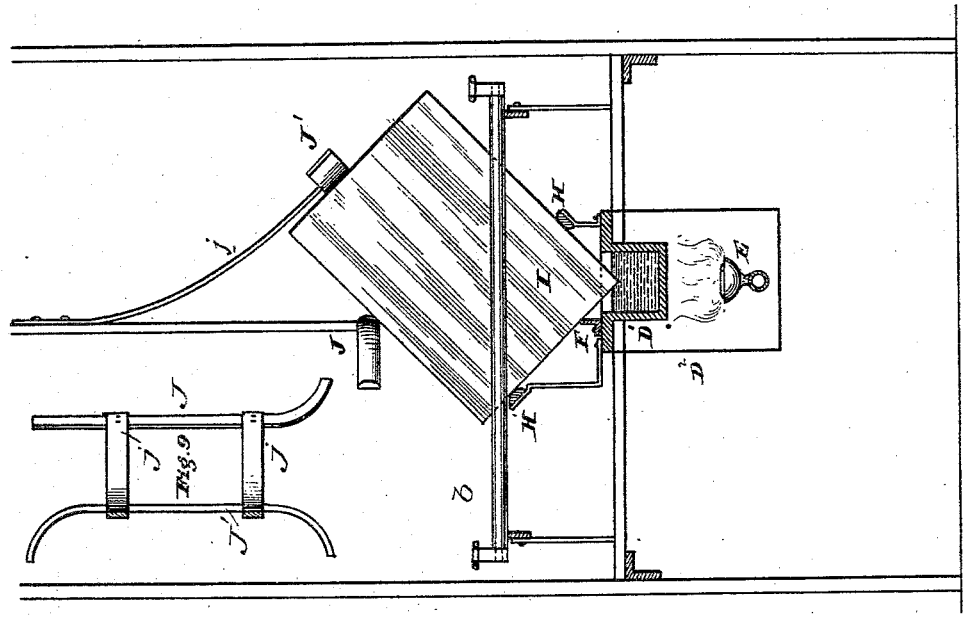
Figure 7:
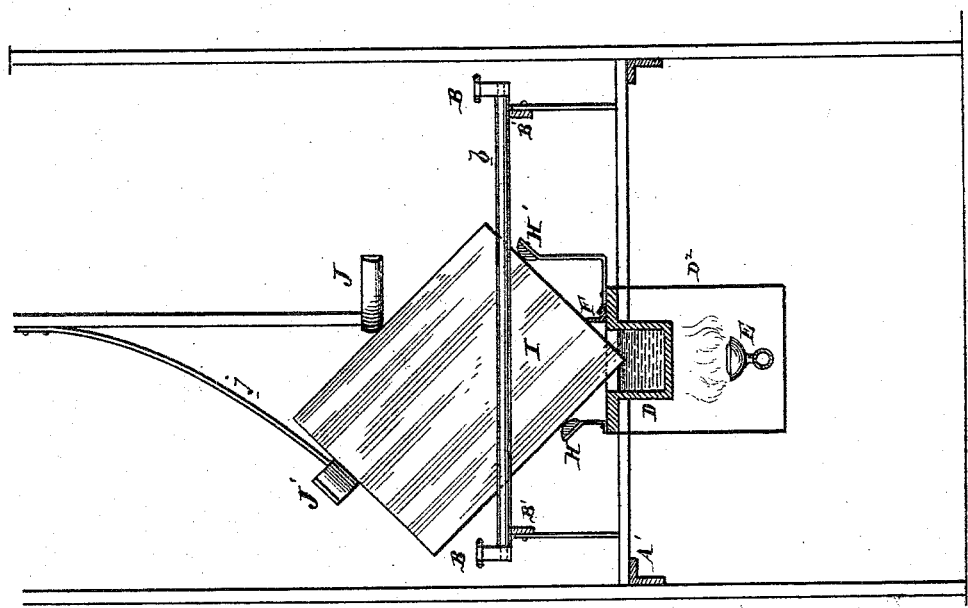

In the drawings, Figure 1 is a side elevation of a can-soldering machine embodying my improvements. Fig. 2 is a sectional plan view of same on line $x\ x$. Fig. 3 is a sectional elevation of that part of the machine which turns the can end for end, (see $y\ y$ of Figs. 2 and 4.) Fig. 4 is a plan view of that part of the machine illustrated by Fig. 3. Fig. 5 is a sectional elevation of that part of the machine which turns the can a quarter of a revolution on a vertical axis, (see $z\ z$ of Fig. 6.) Fig. 6 is a plan view of same. Fig. 7 is a cross-section of the machine. Fig. 8 is also a cross-section of the machine. Fig. 9 is a plan view of the upper guides. Fig. 10 is a perspective view showing the various positions assumed by the cans in having the seams on one head soldered; and Fig. 11 is a sectional elevation of a tin can, showing the form of seams generally used, and one method of applying the acid.

A is the frame of the machine. A' is the table over which the can is carried on guide-rails F H H' H² G, by rods or rollers $b$, secured to and carried by endless chains B, which travel over guide-wheels C, and are driven by a belt-wheel, C'. The rollers or rods run upon guides as they pass over the table in the direction of the arrow, Fig. 1.

The machine may be considered as being divided into two main divisions united by the reversing mechanism which turns the can upside down, and each of which divisions completely solders one end of the can. Each of the divisions may be considered as subdivided into three parts—viz., one to solder two diagonally-opposite edges, one to turn the can a quarter of a revolution, and one to solder the remaining two edges. The first and last of these parts are composed of two portions—viz., one to solder each seam. Therefore, summing up the machine, there are eight parts for soldering the seams, all alike, with the exception that in four of said parts the can leans to the right, and in the other four it leans to the left; two parts which turn the can a quarter of a revolution to present unsoldered seams, which parts are alike; and one part for turning the can end for end. Therefore, while the machine appears complicated, it is in reality composed of only three distinct and different sections. The can I is first placed on the two rails G at the right end of the machine, Fig. 1, and is caught by one of the rods $b$ and carried forward upon the central rail, F, and simultaneously tipped to the position shown in Fig. 8, the bottom of the can resting on the central rail, F, and guide H', and the lowermost side resting upon the guide H. To insure the seam of the can entering the solder in the trough D', (located on the right of the central rail,) its upper edge passes between the guide J and spring-guide J' j. The solder in the trough is kept hot and in a liquid condition by gas-burners E, inclosed in hoods D². As the can is carried on by the endless carrier, the guides H and H' change—that which was lowest is now highest, and vice versa, just as if they were exchanged—and the can passes from the guides J J'. It is thus tipped over in the other direction upon the central rail as a fulcrum, as shown in Fig. 7, so that its diametrically-opposite seam dips into the next solder-trough, which is situated on the left of the central guide, and, as before, the can is forced into the solder by guides J J'. After leaving the guides J J' it is righted by guides H² and runs upon the double rails G. It is carried on, and just before reaching the turntable mechanism K, consisting of the turntable K' and its connections, the can is struck by the kicker O, which throws the can forward upon the turn-table K' in advance of its rod b, and it is turned a quarter of a revolution before the said bar or rod reaches it again; otherwise it could not be turned. When thrown forward, it strikes a hinged lever, L, whose motion is limited in one direction by a toe, L', and which is kept in position by a light spring, l. This lever or arm acts as a point about which the can is turned, and when the quarter of a revolution is made the can is carried forward again upon the two rails G, and then undergoes the first two operations once more.

The kicker O may be operated as follows: A shaft, P, carrying miter-gear K², causes the turn-table to be rotated uniformly, and also rotates a cam-disk, P', having a notch, p. The kicker O is provided with a crank-arm, O', connected by a rod, P⁵, to a hinged arm, P³, which arm is connected near its fulcrum by a rod, P², with lever P⁴, which is weighted, so as to cause its end to run against the face of the disk P'. As said disk revolves, the end of lever P⁴ falls into the notch p, and through the agency of the levers the kicker is quickly thrown up to strike the can as it passes. Any other form of mechanism may be used, if desired. The first two operations described soldered the edges 1 and 2 of the X end of the can, and the last two operations referred to solder the edges 3 and 4. (See Fig. 10.) After having all of the seams soldered on the X-head of the can it once more presses upon the two rails G and between guides H³, and during its passage it is struck by the hinged lifter M', which is actuated by a cam on a shaft, N, rotated by chain N', and is lifted, as shown in Fig. 3, causing it to fall upon its side, as indicated in dotted lines. Its rear end is then raised by lifter M², which is actuated by arm m being pressed down by one of the rods b of the endless carrier, as shown. By this mechanism the can is turned in front of its bar b, which movement is enabled, as in turning upon its edges it gains upon the said bar and its endless carriers. This turns the X end of the can up, and the Y end down, as indicated in Fig. 10, which figure illustrates all of the positions assumed by the can in passing through the machine up to this point. The remaining manipulations of the can are identical with those before given, and are produced by identically the same devices, and need no further description. The solder-troughs D D' are arranged on opposite sides of the central rail, F, and are preferably connected together by a neck, d. The gas and air for the burners E are supplied from pipes e' e², which unite in a single pipe, e, and are controlled by valves e³.

I do not limit myself to any particular form of mechanism for turning the cans the quarter of a revolution, nor for turning them end for end, as these devices may be made in various ways, and when combined in a machine of this kind are to be regarded as elements in a generic sense.

If the can is to receive acid as it passes through its various manipulations, the acid-brushes S may be applied to the diagonally-opposite sides every time the can assumes a vertical position, and before it enters the next solder-trough—for instance, as at points marked S in Fig. 2—and may be applied in the manner shown in Fig. 11, in which S is the adjustable acid-brush, T is the acid-tank, and t a conducting-pipe, having cock t' to regulate the supply; or any other means may be used.

Having now described my invention, what I claim as new, and desire to secure by Letters Patent, is—

1. In an organized can-soldering machine, the combination of solder-troughs and means to keep the solder liquid, with a central rail, guides to tip the can first to one side and then to the other upon said central rail as a fulcrum as it passes over said troughs, and means to convey the cans over said troughs, substantially as and for the purpose specified.

2. In an organized can-soldering machine, the combination of solder-troughs and means to keep the solder liquid, with guides to tip the can first to one side and then to the other as it passes over said troughs, and mechanism for giving a quarter of a turn to said can after having two of its seams soldered, and means to convey the cans over said troughs, substantially as and for the purpose specified.

3. In an organized can-soldering machine, the combination of solder-troughs and means to keep the solder liquid, with guides to tip the can first to one side and then to the other as it passes over said troughs, guides to press the can down into the solder, and means to convey the cans over said troughs, substantially as and for the purpose specified.

4. In a can-soldering machine, an endless carrier, two sets of solder-troughs, stationary guides to support said can, and mechanism to dip the edges of the can successively into said solder to the diametrically-opposite edges on one end before applying the solder to the remaining edges on that end, which is then done in the same order, and then apply the solder to the other end of the can, in combination with intermediate devices for turning the can upside down, substantially as and for the purpose specified.

5. In a can-soldering machine, two sets of soldering apparatus—one for each head—each consisting of solder-troughs, means to keep the solder liquid, guides to tip the can alternately to opposite sides as it passes over said troughs, and mechanism for giving a quarter of a revolution to the can after having two of its seams soldered, in combination with an endless carrier for the cans and intermediate devices for turning the can upside down, substantially as and for the purpose specified.

6. In a can-soldering machine, two sets of soldering apparatus—one for each head—each consisting of solder-troughs, means to keep the solder liquid, guides to tip the can alternately to opposite sides as it passes over said troughs, acid-applying devices, and mechanism for giving a quarter of a revolution to the can after having two of its seams soldered, in combination with an endless carrier for the cans and intermediate devices for turning the cans upside down, substantially as and for the purpose specified.

7. In an organized can-soldering machine, the combination of solder-troughs and means to keep the solder liquid, with a central rail, stationary guides to tip the can first to one side and then to the other as it passes over said troughs, the central rail acting as a fulcrum, acid-applying devices, and means to convey the cans over said troughs, substantially as and for the purpose specified.

8. The combination of the central rail, F, solder-troughs D D', means to heat said troughs, guide-rails H H', and means to feed the can over said rails, substantially as and for the purpose specified.

9. The combination of the central rail, F, solder-troughs D D', means to heat said troughs, guide-rails H H', pressure-guides J J', and means to feed the can over said rails, substantially as and for the purpose specified.

10. The combination of the central rail, F, solder-troughs D D', means to heat said troughs, guide-rails H H', means to feed the can over said rails, consisting of chains B, having cross-bars $b$, and rails B', substantially as and for the purpose specified.

11. The combination of rails G, guides $H^2$, an endless carrier having bars $b$, and turn-table K', substantially as and for the purpose specified.

12. The combination of rails G, guides $H^2$, an endless carrier having bars $b$, kicker O, and turn-table K', substantially as and for the purpose specified.

13. The combination of rails G, guides $H^3$, endless carrier, and lifters M' $M^2$, substantially as and for the purpose specified.

In testimony of which invention I hereunto set my hand.

FRANK W. EDWARDS.

Witnesses:
R. M. HUNTER,
FRANCIS S. BROWN.